United States Patent [19]

Nelsen et al.

[11] Patent Number: 5,076,140
[45] Date of Patent: Dec. 31, 1991

[54] METHOD AND SYSTEM FOR HYDRAULICALLY POSITIONING AND IMPACT LOAD CUSHIONING OF A WORKPIECE

[75] Inventors: Stanley D. Nelsen, Clackamas; James I. Ott, Portland, both of Oreg.

[73] Assignee: Pacific Fluid Systems, Corp., Portland, Oreg.

[21] Appl. No.: 630,392

[22] Filed: Dec. 18, 1990

Related U.S. Application Data

[63] Continuation of Ser. No. 322,084, Mar. 10, 1989, abandoned.

[51] Int. Cl.⁵ .............................................. F01B 7/18
[52] U.S. Cl. ........................................ 91/235; 91/321; 91/450; 60/461
[58] Field of Search .............. 60/414, 461; 91/235, 91/321, 417 R, 450

[56] References Cited

U.S. PATENT DOCUMENTS

| | | |
|---|---|---|
| 2,613,703 | 10/1952 | Calvert . |
| 2,778,193 | 1/1957 | Stockett, Jr. ............... 60/387 |
| 3,068,914 | 12/1962 | Sanborn . |
| 3,361,034 | 1/1968 | Rothrock . |
| 3,877,225 | 4/1975 | Sylvester ................ 60/461 |
| 4,335,993 | 6/1982 | Nowak . |
| 4,344,609 | 8/1982 | Bond . |
| 4,409,792 | 10/1983 | Nowak . |
| 4,539,814 | 9/1985 | McKie . |
| 4,779,513 | 10/1988 | Kimura . |

Primary Examiner—Edward K. Look
Assistant Examiner—Christopher M. Verdier
Attorney, Agent, or Firm—Marger, Johnson, McCollom & Stolowitz Inc.

[57] ABSTRACT

A hydraulic positioning means is provided which includes means for selectively allowing or prohibiting the flow of the first hydraulic fluid under the operating pressure. It also includes means in the hydraulic positioning means for selectively positioning the workpiece to a plurality of predetermined locations for performing work operations thereon in response to allowing or prohibiting the flow of the first pressurized hydraulic fluid under the operating pressure. Means are also furnished for supplying the first pressurized fluid under the operating pressure to the hydraulic positioning means for such selective positioning of the workpiece. First fluid conduit means transfer the first pressurized fluid at said operating pressure from the pressurized fluid supply means to the hydraulic positioning means. A hydraulic impact load cushioning means is also bifurcatedly provided. The hydraulic impact load cushioning means receives second pressurized hydraulic fluid conveyed thereto from the hydraulic positioning means during the impact loading operations and thereby cushioning the impact transmitted by the workpiece. The cushioning pressure is less than the operating pressure. Second fluid conduit means are furnished for transferring the second pressurized fluid on impact under the cusioning pressure from the hydraulic positioning means to the hydraulic impact load cushioning means.

17 Claims, 3 Drawing Sheets

METHOD AND SYSTEM FOR HYDRAULICALLY POSITIONING AND IMPACT LOAD CUSHIONING OF A WORKPIECE

This is a Continuation of application Ser. No. 07/322,084 filed Mar. 10, 1989 and now abandoned.

BACKGROUND OF THE INVENTION

This invention relates to systems for hydraulically positioning a workpiece which includes impact loading, and more particularly, to a system which is capable of both automatically, accurately, and responsively positioning a workpiece and cushioning substantial impacting forces transmitted to the hydraulic positioning system by a workpiece.

Hydraulic drive systems are known and widely used for driving loads in a reciprocal path in which substantial force is required to accelerate the load at the beginning of the movement in each direction and substantial energy is absorbed in decelerating the load at the end of the movement in each direction. Many such systems conventionally employ a hydraulic cylinder including means for supplying hydraulic fluid under pressure to the cylinder to move a piston connected through a rod to the load.

Hydraulic drive systems are useful in a number of applications but are particularly adapted for use in sawmill drive systems. In U.S. Pat. No. 4,539,814, for example, a work operation comprising a conventional sawmill operation is described. In these types of operations, workpieces in the form of logs enter a sawmill on a conveyor and are stored on a log deck. Individual logs are then moved onto a sawmill carriage disposed along a fixed track and are moved in a reciprocal path past the saw employing suitable drive means. From a stationery starting or loading position adjacent the deck, the log and carriage are accelerated to the desired rate for sawing, are then moved at a substantial uniform rate as the log traverses the saw at a sawing station to have a slab or board removed therefrom. Toward the end of the sawing operation, the log and carriage are decelerated and ultimately stopped after the log has moved completely past the saw. The log and carriage are then driven in opposite directions and returned to a starting position where it is again brought to a stop after the log has again cleared the sawing station. The log is indexed laterally on the carriage to enable a second board to be removed and the process repeated until an optimum amount of boards are cut from a given log. Because of the heavy weight of the carriage and logs, substantial energy is required to accelerate and decelerate the carriage at the beginning and end, respectively, of its movement in each direction. Also, for economical reasons, it is desirable to repeat the cutting procedure as quickly as possible to maximize the number of board feet produced by a given sawmill system. Therefore, extremely large forces are involved in accelerating and braking the carriage in order to maximize the sawmill operations.

In U.S. Pat. No. 2,613,703, for example, a volumetric hydraulic system, including means for accumulating a preselected volume of pressure fluid and for discharging same into an appropriate delivery conduit is provided. This hydraulic system includes means for accumulating a preselected volume of pressure fluid and for injecting same into a hydraulic actuator for displacing the reciprocal member thereof through an increment of movement proportional to such preselected volume. In this way, the position of a set of one or more moveable knees in a sawmill is precisely controlled.

In U.S. Pat. No. 3,361,034, a load positioning device is provided, having infinite settings throughout its operating range and a predetermined set position which is maintained from the same direction. The device allows a load to be automatically moved in a desired direction, from an initial setpoint, upon selection of a new setpoint. All of this is accomplished employing a hydraulic positioning cylinder.

A sawmill setworks is provided in U.S. Pat. No. 3,068,914 having hydraulic actuating means in which accurate setting is obtained by injecting a pre-determined quantity of hydraulic fluid into the hydraulic setworks mechanism.

None of the above described prior art systems include means for cushioning the impact during impact loading of a workpiece or during hydraulic positioning of a workplace, respectively, but merely deal with the positioning aspects per se.

In U.S. Pat. No. 4,539,814, a hydraulic drive system for a carriage drive circuit is provided in which accumulators are used for reciprocatingly driving a heavy load. Thus, averaging accumulators and braking accumulators are employed for driving a sawmill carriage. Deceleration of the moving carriage is accomplished by an accumulator which is set to operate at or above the main system operating pressure. Thus, this system is designed to decelerate and cushion a moving cylinder piston connected to a high inertia load.

U.S. Pat. No. 4,335,993, and U.S. Pat. No. 4,409,792, relate to hydraulic positioning apparatus for precisely and rapidly positioning objects of the type likely to exert high impact or shock loads on the positioning apparatus. In particular, these patents relate to improvements in hydraulic positioning of the automatic type in which a controller responsive to the position of the apparatus automatically controls its movement so as to obtain precise positioning. The system comprises a hydraulic positioning cylinder which is constantly balanced against system pressure at the source of pressurized hydraulic fluid through a one-way check valve which opens fully instantaneously and allows immediate relief of over-pressurized fluid when the pressure of the fluid in the motor exceeds the operating hydraulic pressure of the system. In other words, over pressurized fluid resulting from an impact load is routed through a one-way check valve back to the main supply accumulator. This allows absorption of a gross portion of the impact energy, but its real effectiveness is highly dependent on the main system pressure and the state of charge or discharge of the main supply accumulator. Since the pressure level in this accumulator is at maximum operating pressure, impact pressure will only be absorbed when it exceeds the operating pressure of the system. However, for maximum fast reaction and effectiveness, and to instantaneous cushion impact loads, one must be able to initiate the cushioning process at a pressure substantially less than the maximum system supply pressure.

U.S. Pat. No. 4,344,609 is directed to a knee carriage cushioning device using a gas-filled pneumatic device for resiliently absorbing force from an object moving against a resilient positioning apparatus. Pneumatic gas pressure must be set at a high enough level so that it does not interfere with normal working loads. Therefore, as in the case of U.S. Pat. No. 4,335,993 and U.S.

Pat. No. 4,409,792, high-impact pressures must result before impact-absorbing action will occur.

In U.S. Pat. No. 4,779,513, a pneumatic positioning device is described which includes a pneumatic cylinder, accommodating piston movement in the cylinder in to supply and discharge of compressed air. As described with respect to U.S. Pat. No. 4,344,609, for pneumatic gas-pressure devices, high operating pressures must be set and overcome in this system in order to lock out the circuit for normal operation.

Accordingly, a need exists for a hydraulic positioning system which is able to provide for maximum fast reaction to cushion instantaneous impact loads both at pressures above the operating pressures on the one hand, and at pressures below operating pressure on the other hand.

SUMMARY OF THE INVENTION

The present invention provides a hydraulic positioning system which cushions impact loads in a more effective, efficient, automatic, quick and precise manner than presently provided by the prior art. This invention is especially suitable on systems such as sawmill setworks on carriages which position setting knees to within a few thousandths of an inch, in spite of extremely high impact loads caused by heavy logs being loaded against the knees. More specifically, the subject system satisfies the above existing needs by providing a system and a method capable of minimizing time and maximizing the effectiveness of cushioning impact loads imparted to a hydraulic positioning system during impact loading operations.

In order to accomplish this optimum overall effect during all stages of operation, a bifurcated system is provided in which typical selective positioning operations are conducted on the workpiece under an operating pressure, but which bifurcatedly cushions the impact imparted by the workpiece to the system during impact loading operations at pressures below the operating pressure. The system generally comprises means for conducting normal positioning operations at a first hydraulic pressure, and means for cushioning impact during impact loading operations at a second hydraulic pressure.

A hydraulic positioning means is provided which includes means for selectively allowing or prohibiting the flow of the first hydraulic fluid under the operating pressure. It also includes means in the hydraulic positioning means for selectively positioning the workpiece to a plurality of predetermined locations for performing work operations thereon in response to allowing or prohibiting the flow of the first pressurized hydraulic fluid under the operating pressure. Means are also furnished for supplying the first pressurized fluid under the operating pressure to the hydraulic positioning means for such selective positioning of the workpiece. First fluid conduit means transfer the first pressurized fluid at said operating pressure from the pressurized fluid supply means to the hydraulic positioning means.

A hydraulic impact load cushioning means is also bifurcatedly provided. The hydraulic impact load cushioning means receives second pressurized hydraulic fluid conveyed thereto from the hydraulic positioning means during the impact loading operations and thereby cushioning the impact transmitted by the workpiece. The cushioning pressure is less than the operating pressure. Second fluid conduit means are furnished for transferring the second pressurized fluid on impact under the cushioning pressure from the hydraulic positioning means to the hydraulic impact load cushioning means.

Hydraulic fluid control means, which are generally automatic in nature, are employed in the system of this invention. These control means include means for selectively controlling the transfer of the first pressurized hydraulic fluid in the first fluid conduit means to the hydraulic positioning means from the pressured hydraulic fluid supply means. This will facilitate the positioning of the workpiece at a plurality of predetermined locations. Since the system is bifurcated, it also includes means for selectively controlling the transfer of the second pressurized fluid between the hydraulic positioning means and the hydraulic impact load cushioning means. The purpose of this second control fluid transfer is for cushioning the impact of the workpiece during the impact loading operations under the cushioning pressure, rather than under the operation pressure. The hydraulic fluid control means can also include means for sequentially controlling the transfer of the first and second pressurized hydraulic fluid for sequentially performing the respective workpiece positioning operations and impact loading operations at the respective differing operating pressures.

In comparing the relative magnitude of the respective operating and cushioning pressures, it is preferred that the operating pressure of the first hydraulic fluid is at least about 25%, more preferably at least about 50%, and most preferably at least about 100% higher than the cushioning pressure of the second pressurized hydraulic fluid. Moreover, as for the operating pressure of the first pressurized hydraulic fluid per se, it is preferably not less than about 1000 psi, more preferably not less than about 1200 psi, and most preferably not less than about 1500 psi. Further, the cushioning pressure of the second pressurized hydraulic fluid is preferably not greater than about 900 psi, and more preferably not greater than about 800 psi.

The fluid control means can further include means for selectively and sequentially allowing and prohibiting the transfer of the first and second pressurized hydraulic fluid. In this way, the transfer of first pressurized fluid is provided to the hydraulic positioning means when the transfer of the second hydraulic fluid to the cushioning means is prohibited from the hydraulic impact loading means. Likewise, the transfer of second pressurized fluid from the hydraulic impact loading means to the cushioning means is allowed, when the transfer of the first hydraulic fluid to the hydraulic positioning means is prohibited.

In the preferred system of the present invention, the cushioning means comprises an accumulator means for receiving the second pressurized hydraulic fluid. Furthermore, a third fluid conduit means is provided for eliminating the second hydraulic fluid from the hydraulic impact load cushioning means. In this way, the cushioning means will again be available for receiving the second hydraulic fluid from the impact loading means on subsequent impact. More specifically, the third fluid conduit means includes means for selectively controlling the transfer of the second hydraulic fluid to a fluid storage means thereby emptying the second hydraulic fluid from the hydraulic impact load cushioning means. The system can also contain means for converting the system to either a regenerative or a nonregenerative mode. Finally, in the preferred end use application of the subject system, the workpiece comprises a log and the hydraulic positioning and impact loading means comprises a sawmill setworks.

In use, a method is generally shown herein for hydraulically positioning and hydraulically cushioning the impact loading of a workpiece, respectively. First, various components of the previously described system for hydraulically positioning and hydraulically cushioning the impact loading of a workpiece are provided. Then, first pressurized fluid supply means and the hydraulic impact load cushioning means are connected to the hydraulic positioning means. Next, the flow of second pressurized fluid under a cushioning pressure is prohibited from the hydraulic positioning means to the hydraulic impact load cushioning means. The first pressurized hydraulic fluid can then be supplied under the operating pressure by the first conduit means to the hydraulic positioning means which is positioned at a predetermined fixed location for performing work operations on the workpiece. After completing the positioning operation, the flow of first pressurized fluid to the hydraulic positioning means is prohibited. The impact loading step is now ready to commence. Accordingly, the second pressurized hydraulic fluid is allowed to flow from the hydraulic positioning means to the hydraulic impact load cushioning means. The workpiece is loaded against the hydraulic positioning means, and the impact of the workpiece transmitted during the impact loading operation is cushioned by the impact load cushioning means at a pressure below the operating pressure. After the impact loading operations are concluded, the flow of the second pressurized fluid under the cushioning pressure from the hydraulic impact loading means is terminated. The first pressurized hydraulic fluid can again be supplied under the operating pressure to the hydraulic positioning means and the work operations on the workpiece can be performed. The above-described third fluid conduit means can also be provided. In that instance, the second hydraulic fluid is selectively transferring from the impact load cushioning means to a storage means thereby eliminating the second hydraulic fluid from the impact load cushioning means.

The foregoing and other objects, features and advantages of the invention will become more readily apparent from the following detailed description of a preferred embodiment which proceeds with reference to the drawings.

DETAILED DESCRIPTION OF A PREFERRED EMBODIMENT

Figure 1:
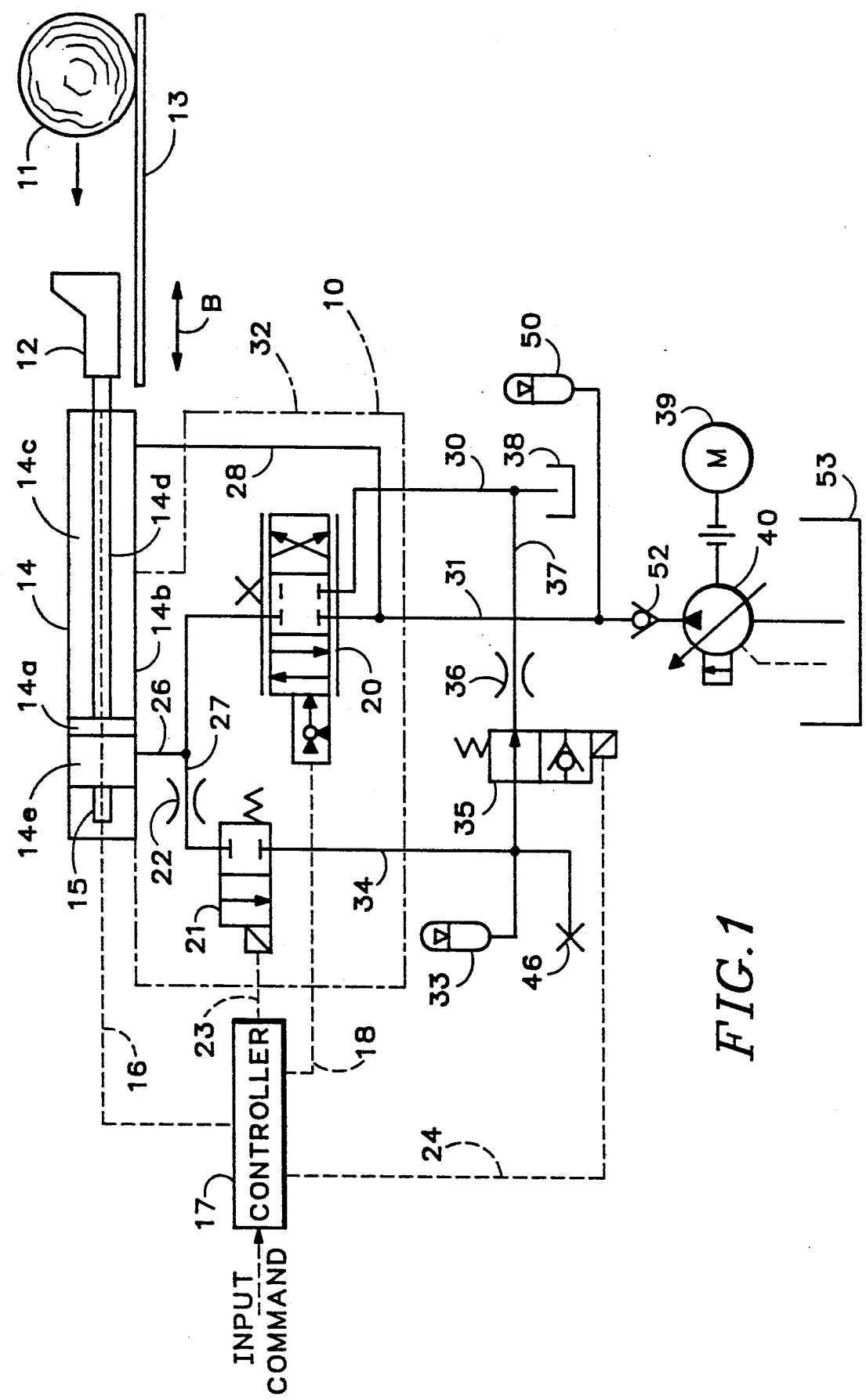
FIG. 1 is a schematic diagram of a bifurcated, regenerative hydraulic positioning and impact load cushioning system of the present invention.

Referring now to FIG. 1, a bifurcated, hydraulic positioning and impact load cushioning system 10 of the regenerative type is shown. The impact load cushioning section of the system 10 includes an electrically operated 2-position 2-way control valve 21 such as a Model 14C21S, manufactured by Waterman Hydraulics of Chicago, Ill. Valve 21 directs fluid which becomes overpressurized when workpiece 11 impacts against knee assembly 12 from within a hydraulic actuator 14, typically a hydraulic cylinder, to an impact load cushioning means, such as an accumulator 33, and more particularly a hydropneumatic accumulator. A typical hydropneumatic accumulator useful in the impact loading system 10 is Part No. 800730, manufactured by Greer Hydraulics of City of Commerce, California. An expandable bag containing a gas is inserted into the accumulator 33 and fills same when the accumulator is empty.

The impact load cushioning section of system 10, including accumulator 33, is bifurcated from the main operating section of system 10 which is used only for positioning of a workpiece 11. Thus, when the impact load cushioning section is activated by opening control valve 21 and closing control valve 35, the main operating section will attempt to hold position with the servo valve 20 being substantially closed, and vice-versa. The impact load cushioning section of system 10 is used only to instantaneously receive and cushion the effects of the overpressurized hydraulic fluid when it exceeds a selectively predetermined precharged value. The pressure in accumulator 33 is precharged to a predetermined pressure specifically suitable for cushioning the impact load of the workpiece 11, such as a log or the like. This pressure is substantially lower than the pressure in accumulator 50 of the main operating hydraulic circuit. In this way, the impact loading and workpiece positioning phases can each be carried out at their respective optimum hydraulic pressures thereby maximizing the effectiveness and efficiency of the system operation.

Workpiece positioning is conducted employing a hydraulic actuator 14, which typically comprises a linear hydraulic cylinder assembly, including a movable piston 14a extensibly mounted within a cylinder housing 14b. In the exemplary systems depicted in FIGS. 1-3, rod end 14c of piston 14a is joined to knees 12 by connecting rods 14d. Work operations can be conducted on the log 11 by introducing the log onto a sawmill carriage 13. The log is clamped in place and the carriage 13 is moved in a reciprocal path normal to the general path of travel of the log, designated by arrow "B", as it moves to a point adjacent knees 12.

The valve 21 can be sequentially opened or closed by automatic controller 17 responsive to input commands programmed into the controller memory. Controller 17 can comprise a Model DB-100 manufactured by Pacific Fluid Systems of Portland, Oreg. Knees 12 can be set to a predetermined fixed operating position by a signal transmitted from controller 17 via line 18. Valve 21 is opened by controller 17 which emits a signal to the valve via line 23. In this open position, the system 10 can be instantaneously relieved of any excess hydraulic fluid exhausted from the hydraulic actuator 14 on impact by workpiece 11 against knees 12. The overpressurized hydraulic fluid exits from the hydraulic actuator 14 through conduit 26 and 34 and is instantly accepted by the cushioning accumulator 33 so that the time to effectively and efficiently complete the impact load cushioning phase of the total operation cycle is minimized. An orifice 22 can be installed upstream of the valve 21 to preliminarily absorb some of the impact load from the overpressurized fluid moving toward valve 21, and thus protect the valve from being subjected to the entire instantaneous effect of the impact pressure.

After the impact load subsides and hydraulic actuator 14 is in a stable operating position, the controller 17 will instruct a plurality of clamping arms (not shown) to extend about the workpiece 11 clamping it against the setting knees 12. At this same time, the controller will command the 2-position control valve 21 to close, effectively deactivating the impact load cushioning section, and in turn deactivating the cushioning accumulator 33 from the circuit. Also, at this same instant, a second 2-position control valve 35, of similar construction to valve 21, which has been closed during the impact load cushioning phase, is opened to allow the accumulator 33 to be emptied to tank 38 at a controlled rate through orifice 36 and conduit 37. This eliminates the hydraulic fluid from within the accumulator 33 and prepares it to receive the next impact load. When the next workpiece 11 is ready to impact against the knees 12, the controller 17 will command valve 21 to again open and valve 35 to close while also instructing a servo valve 20, via line 18, to hold the knees 12 in a desired precise position, measured by the feedback transducer 15 mounted in the hydraulic actuator 14. Servo valve 20 can comprise a Model 242, manufactured by Atchley Controls of Canoga Park, Calif.

This invention shown in FIG. 1 protects the base end 14e of a double acting hydraulic cylinder actuator 14 against high shock pressures. The cylinder is shown connected in a regenerative type circuit, i.e., in a regenerative mode, where main pump 40 pressure is hydraulically connected via conduit 31 to servo valve 20 and conduit 28 to the cylinder rod end 14c. A check valve 52 is located after the outlet from pump 40 to protect the pump from backflow caused by the system. Servo valve 20 is moved to a metering position by controller 17 via line 18 when the system 10 is in the positioning mode so that the hydraulic fluid in conduit 26 meters fluid to the actuator 14 from fluid reservoir 53 through pump 40 driven by motor 39. Additional hydraulic fluid can be provided from main accumulator 50 to actuator 14. Pressure is constantly applied to the rod end 14c of the actuator and can make up any fluid required in the rod end 14c due to an impact causing the piston to move to the left, by way of hydraulic fluid in line 28.

Figure 2:
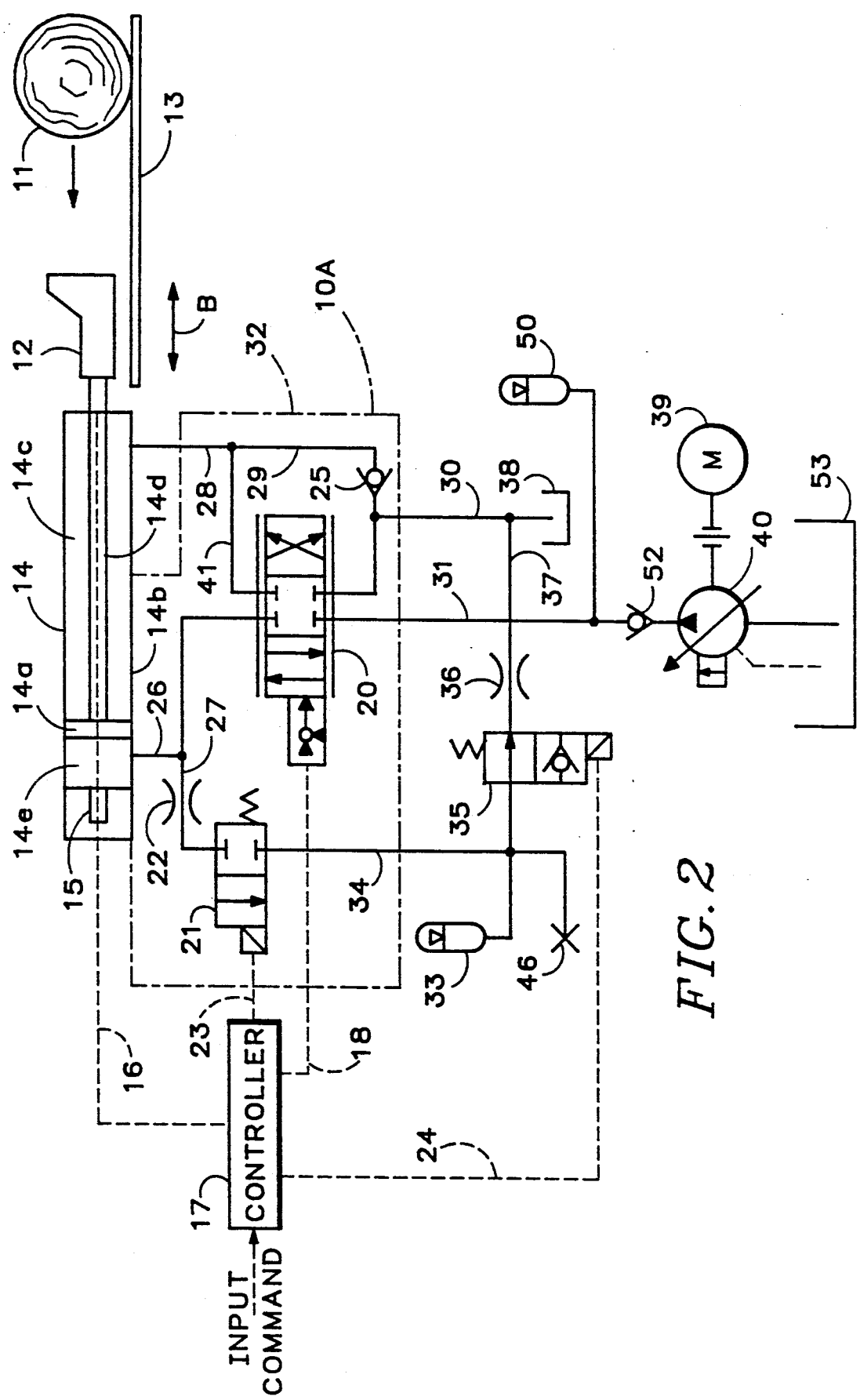
FIG. 2 is a schematic diagram of a bifurcated, nonregenerative hydraulic positioning and impact load cushioning system of the present invention.

System 10 has been modified in FIG. 2 to provide a system 10A in a nonregenerative mode. In system 10A, a hydraulic actuator 14, which can be a motor or rotary actuator, is connected by conduits 26, 28 and 29 in a standard type of circuit where the servo valve 20 controls both ends of the actuator. In this case, a check valve 25 is interposed to allow make-up fluid to be drawn from the tank 38 into side 14c of the actuator to prevent cavitation during an impact to the left. The remainder of the operating section of the system 10A is the same as in regenerative system 10. The impact load cushioning section of the circuit in FIG. 2 also remains identical to the impact load cushioning section shown in FIG. 1.

Figure 3:
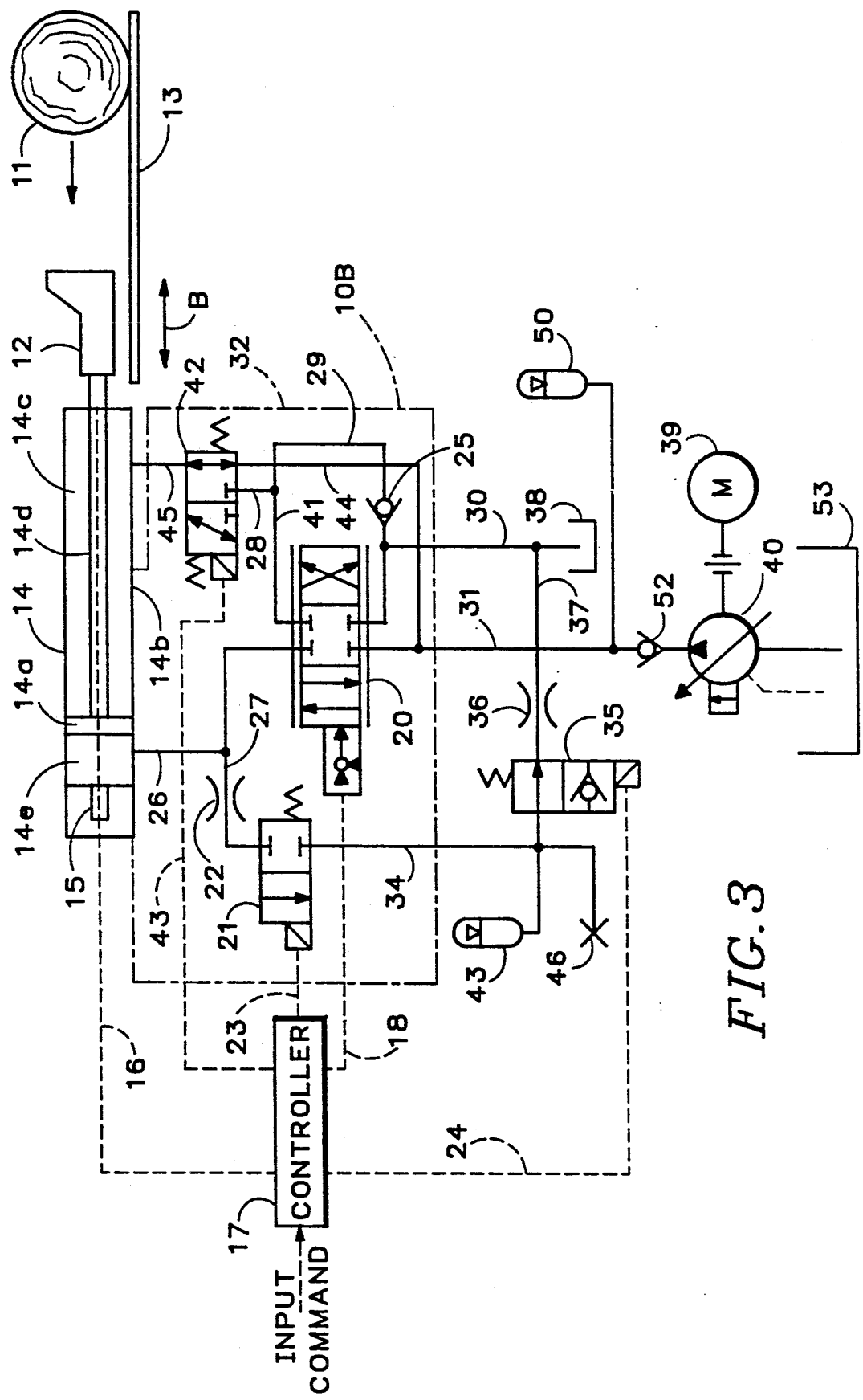
FIG. 3 is a schematic diagram of a bifurcated, hydraulic positioning and impact load cushioning system of the present invention which can be employed in either a regenerative or a nonregenerative mode.

System 10B of FIG. 3 is a bifurcated hydraulic positioning and impact load cushioning system which can be selectively employed in either a regenerative or nonregenerative mode. System 10B employes an added 2-position 3-way valve 42 located within hydraulic conduit 45 and connected to conduit 41 by conduit 28. Valve 42 can comprise a Model SV1-16-3 manufactured by Modular Controls of Villa Park, Ill. By interposing valve 42 in the manner described above, system 10B has the ability to selectively connect the hydraulic actuator 14 in either a regenerative configuration as in system 10 or a nonregenerative configuration as in system 10A. The controller 17 can make this choice by transmitting the requisite signal via line 43 to signal valve 42. This will allow the system to take advantage of the higher speeds characteristic of a regenerative circuit and then switch to a standard circuit with its advantages of higher actuator force and precision positioning. Again, the remainder of the operating section of the system 10B is the same as system 10, and the impact load cushioning section of system 10B is identical to the impact load cushioning section shown in FIG. 1.

The enclosure line 32 in FIGS. 1, 2 and 3 indicates that the items shown within the enclosure can be conveniently mounted in one manifold block which then mounts directly onto the hydraulic actuator 14 to minimize plumbing and increase system stiffness for high positioning accuracy.

This invention can be effectively and efficiently adapted to a sawmill carriage setworks system comprised of any number of hydraulic actuators 14 and knees 12. Each knee 12 would include its own actuator 14 and the appropriate cushioning manifold. Only one cushioning accumulator 33, drain valve 35 and orifice 36 need be used as long as the fluid lines 34 from the other knees are interconnected to a port 46.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

We claim:

1. A bifurcated system for hydraulically positioning and for hydraulically cushioning impact loads imparted thereto by a workpiece, respectively, which comprises:
hydraulic positioning means including means for selectively allowing or prohibiting the flow of a first hydraulic fluid under an operating pressure, and means in said hydraulic positioning means for selectively positioning said workpiece at a plurality of predetermined locations for performing work operations thereon in response to allowing or prohibiting the flow of said first pressurized hydraulic fluid under said operating pressure;
means for supplying said first pressurized fluid under said operating pressure to said hydraulic positioning means for selectively positioning said workpiece;
first fluid conduit means for transferring said first pressurized fluid at said operating pressure from said pressurized fluid supply means to said hydraulic positioning means;
hydraulic impact load cushioning means including means for receiving a second pressurized hydraulic fluid under a cushioning pressure from said hydraulic positioning means during said impact loading operations and thereby cushioning said impact load transmitted by a workpiece, said cushioning pressure being less than said operating pressure;
second fluid conduit means for transferring said second pressurized fluid under said cushioning pressure to said second pressurized fluid receiving means from said hydraulic positioning means; and
hydraulic fluid control means including means for selectively controlling the transfer of said first pressurized hydraulic fluid in said first fluid conduit means to said hydraulic positioning means from said first pressured hydraulic fluid supply means for positioning said workpiece at a plurality of predetermined locations, and means for selectively controlling the transfer of said second pressurized fluid in said second fluid conduit means between said hydraulic positioning means and said second pressurized hydraulic fluid receiving means for cushioning the impact of said workpiece during said impact loading operations.

2. The system of claim 1, wherein said hydraulic fluid control means includes means for sequentially controlling the transfer of said first and second pressurized hydraulic fluid for sequentially performing said respective workpiece positioning operations and impact load cushioning operations.

3. The system of claim 1, wherein the operating pressure of said first hydraulic fluid is at least about 25% higher than the cushioning pressure of said second pressurized hydraulic fluid.

4. The system of claim 1, wherein the operating pressure of said first hydraulic fluid is at least about 100% higher than the cushioning pressure of said second pressurized hydraulic fluid.

5. The system of claim 1, wherein the operating pressure of said first hydraulic fluid is not less than about 1000 psi, and the cushioning pressure of said second pressurized hydraulic fluid is not more than about 800 psi.

6. The system of claim 1, wherein the hydraulic fluid control means includes means for selectively controlling the transfer of said first and second pressurized hydraulic fluid whereby the transfer of first pressurized fluid is provided to said hydraulic positioning means when the transfer of said second hydraulic fluid is prohibited to said hydraulic impact load cushioning means, and whereby the transfer of second pressurized fluid is allowed to said hydraulic impact load cushioning means when the transfer of said first hydraulic fluid is prohibited to said hydraulic positioning means.

7. The system of claim 1, wherein hydraulic impact cushioning means comprises accumulator means for receiving said second pressurized hydraulic fluid.

8. The system of claim 1, which further includes a third fluid conduit means for selectively transferring said second hydraulic fluid from said impact load cushioning means to a storage means thereby eliminating said second hydraulic fluid from said impact load cushioning means.

9. The system of claim 1, wherein said workpiece comprises a log and said hydraulic positioning and impact load cushioning means comprises a sawmill setworks.

10. The system of claim 1, which further includes means for converting said system to either a regenerative or a nonregenerative mode.

11. A method for hydraulically positioning and hydraulically cushioning impact loads of a workpiece, respectively, which comprises:
providing hydraulic positioning means including means for selectively allowing or prohibiting the flow of a first hydraulic fluid under an operating pressure, and means in said hydraulic positioning means for selectively positioning said workpiece at a plurality of predetermined locations for performing work operations thereon in response to allowing or prohibiting the flow of said first pressurized hydraulic fluid under said operating pressure, and hydraulic impact load cushioning means including means for receiving a second pressurized hydraulic fluid under a cushioning pressure from said hydraulic positioning means during said impact loading operations and thereby cushioning said impact load transmitted by a workpiece, said cushioning pressure being less than said operating pressure;
connecting a means for supply a first pressurized fluid under said operating pressure to said hydraulic positioning means;
connecting said hydraulic impact load cushioning means to said hydraulic positioning means;
prohibiting the flow of said second pressurized fluid under said cushioning pressure from said hydraulic positioning means to said hydraulic impact load cushioning means;
supplying said first pressurized hydraulic fluid under said operating pressure to said hydraulic positioning means, and positioning said hydraulic positioning means at a predetermined fixed location for performing work operations on said workpiece;
prohibiting the flow of said first pressurized fluid under said operating pressure to said hydraulic positioning means;
allowing the flow of said second pressurized fluid under said cushioning pressure from said hydraulic positioning means to said hydraulic impact load cushioning means;
loading said workpiece against said hydraulic positioning means and thereby cushioning the impact of said workpiece during said impact loading operations at a pressure above said cushioning pressure;
prohibiting the flow of said second pressurized fluid under said cushioning pressure from said hydraulic positioning means to said impact load cushioning means; and
supplying said first pressurized hydraulic fluid under said operating pressure to said hydraulic positioning and performing said work operations on said workpiece.

12. The method of claim 11, which further includes the step of supplying said first hydraulic fluid at an operating pressure at least about 25% higher than the cushioning pressure of said second pressurized hydraulic fluid.

13. The method of claim 12, wherein said first hydraulic fluid operating pressure is least about 100% higher than the cushioning pressure of said second pressurized hydraulic fluid.

14. The method of claim 11, which further includes the step of providing said hydraulic impact load cushioning means which comprises an accumulator means for receiving said second pressurized hydraulic fluid.

15. The method of claim 11, which further includes the step of providing a third fluid conduit means from said impact load cushioning means to a storage means, and selectively transferring said second pressurized hydraulic fluid to said storage means in said third fluid conduit means thereby eliminating said second pressurized hydraulic fluid from said impact load cushioning means.

16. The method of claim 11, which further includes the step of providing a workpiece which comprises a log and said hydraulic positioning and impact load cushioning means comprises a sawmill setworks assembly.

17. The method of claim 11, which further includes the step of selectively converting said hydraulic positioning means to either a regenerative or a nonregenerative mode.

* * * * *